US005497299A

United States Patent [19]

Wisler et al.

[11] Patent Number: 5,497,299

[45] Date of Patent: Mar. 5, 1996

[54] HEADLAMP ASSEMBLY WITH HOOK-IN BULB SHIELD

[75] Inventors: Jan A. Wisler; John M. Luallin, both of Anderson, Ind.; Duane E. Ormes, Monroe, La.; Randall J. Smith, Anderson, Ind.; Terry L. Coombs, Anderson, Ind.; Ernst K. Werner, Anderson, Ind.

[73] Assignee: General Motors Corporation, Detroit, Mich.

[21] Appl. No.: 353,593

[22] Filed: Dec. 12, 1994

[51] Int. Cl.$^{6}$ .................................................... B60Q 1/02

[52] U.S. Cl. ........................... 362/61; 362/343; 362/351; 362/433

[58] Field of Search ............................ 362/61, 226, 298, 362/302–305, 343, 351, 353, 361, 433

[56] References Cited

U.S. PATENT DOCUMENTS

| | | | |
|---|---|---|---|
| 1,238,484 | 8/1917 | Benjamin | 362/309 |
| 1,245,083 | 10/1917 | Benjamin | 362/292 |
| 1,273,473 | 7/1918 | Finkelstein | 362/301 |
| 1,289,244 | 12/1918 | Otte | 362/351 |
| 1,633,838 | 6/1927 | Zimmerman | 362/61 |
| 1,880,399 | 10/1932 | Benjamin | 362/304 |
| 1,891,846 | 12/1932 | Stauber, Jr. | 362/304 |
| 1,991,866 | 2/1935 | Rich | 362/80 |
| 2,556,328 | 6/1951 | Hinds | 362/309 |
| 3,833,955 | 9/1974 | Hulbert, Jr. | 362/61 |
| 4,636,923 | 1/1987 | Oyama et al. | 362/80 |
| 4,679,127 | 7/1987 | Ernst et al. | 362/303 |
| 4,725,929 | 2/1988 | Huang | 362/80 |
| 4,760,500 | 7/1988 | Peng | 362/74 |
| 4,797,790 | 1/1989 | Brodling et al. | 362/61 |
| 4,831,506 | 5/1989 | Miyazawa | 362/284 |
| 5,067,054 | 11/1991 | Oshio et al. | 362/61 |
| 5,195,815 | 3/1993 | Watanabe et al. | 362/61 |
| 5,199,779 | 4/1993 | Sato | 362/61 |
| 5,402,325 | 3/1995 | Wisler et al. | 362/61 |

*Primary Examiner*—Ira S. Lazarus
*Assistant Examiner*—Alan B. Cariaso
*Attorney, Agent, or Firm*—Ernest E. Helms

[57] ABSTRACT

An automotive vehicle headlamp assembly is provided which includes a reflector housing having an open front end, a first reflector surface and a second surface projecting forward from the first reflector surface; a bulb connected to the housing projecting forward from the reflector surface providing a source of illumination; a lens covering the open end of the reflector housing; and a bulb shield having a first portion generally adjacent the bulb, blocking a portion of the illumination given off by the bulb. The bulb shield has a foot connected by a leg to the first portion. The foot has a front end captured between the lens and the reflector housing and a rear end captured in the intersection between the first and second reflector surfaces.

8 Claims, 3 Drawing Sheets

HEADLAMP ASSEMBLY WITH HOOK-IN BULB SHIELD

FIELD OF THE INVENTION

The field of the present invention is that of vehicle headlamp assemblies, especially vehicle headlamp assemblies which utilize replaceable-type bulbs.

BACKGROUND OF THE INVENTION

Headlamps with aerodynamic styling provide for smaller replaceable halogen bulbs. This permits the lens and reflector housing to remain in place on the vehicle and only requires that the smaller halogen bulb be replaced, should a bulb burn out and require servicing. Replaceable-type bulbs often require a shield over them to prevent light that can cause glare by reflecting on certain surfaces of the reflector housing and then projecting into an unintended area. Each bulb shield acts as a lamp shade in a way, keeping the light away from some areas and controlling light to permit it to reflect outward in other areas. Each bulb shield is different, depending on the shape of the headlamp and subsequently the reflector housing.

Currently, bulb shields are attached to the bulb retainer and come in may different configurations, leading to a large number of components. Some headlamp assemblies require a different bulb mounting system and/or have different reflector optics which will not allow the bulb shield to be attached to a bulb retainer. Therefore, a new mounting system which permits the bulb shield to be attached independently is needed. It should also be noted that bulb shields which are mounted with screws to the reflector housing are not preferred and in some instances are considered to be totally unacceptable. One such bulb shield that allows for attachment to the reflector housing without the use of fasteners while providing for easy installation is shown and described in commonly assigned O'Shaughnessey et al U.S. Ser. No. 08/239,805 now U.S. Pat. No. 5,386,348.

SUMMARY OF THE INVENTION

The present invention provides a vehicle headlamp assembly as an alternative to the aforementioned U.S. Ser. No. 08/239,805. In the present invention, the bulb shield may be fixably attached to the reflector housing without the use of fasteners, allows easy yet very secure installation, and provides for the lens connected to the reflector housing to capture the bulb shield in position.

DESCRIPTION OF THE PREFERRED EMBODIMENT

Figure 1:
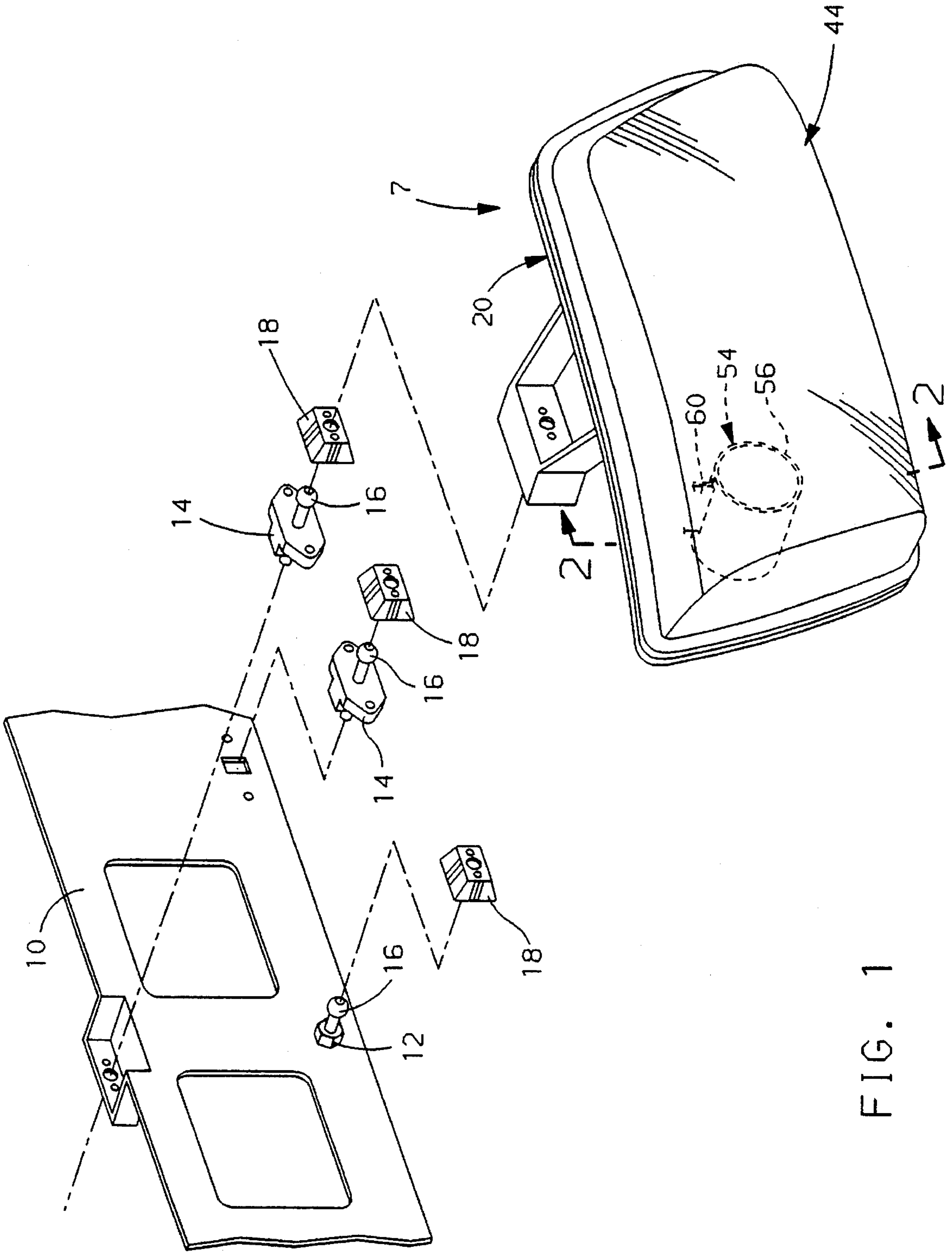
FIG. 1 is an exploded view of a preferred embodiment automotive vehicle headlamp assembly utilized according to the present invention.
Figure 2:
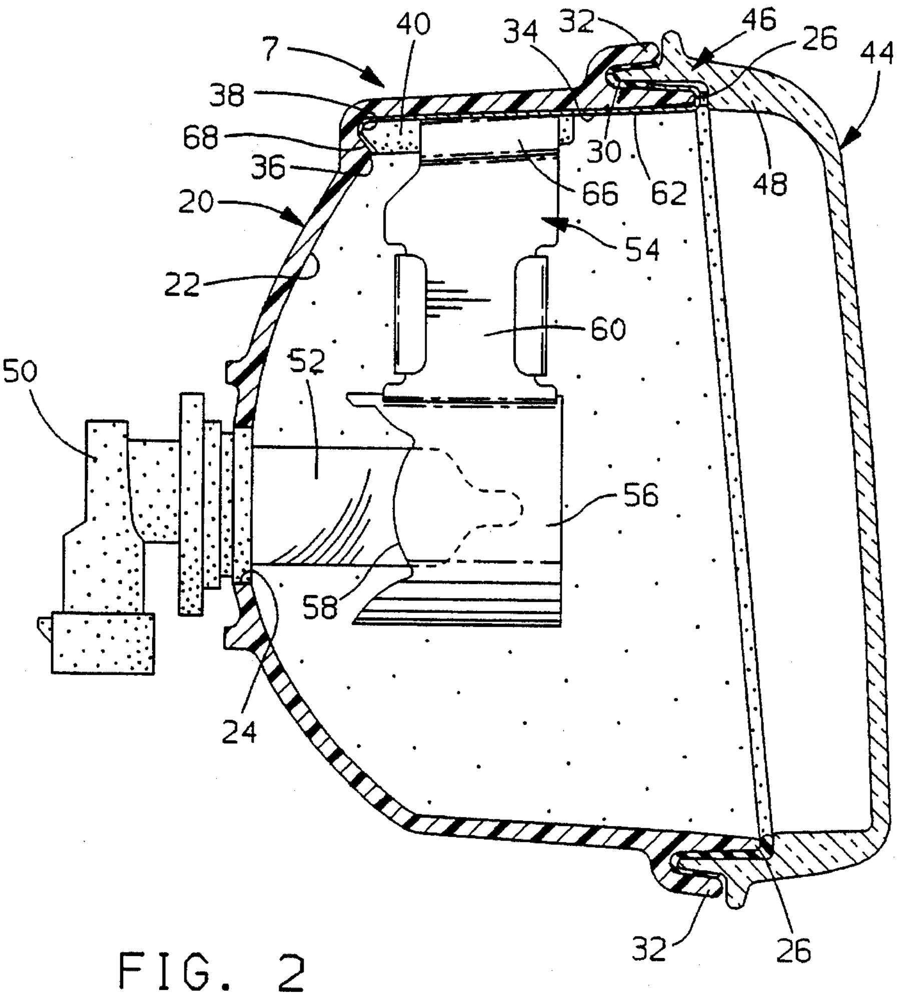
FIG. 2 is a view taken along line 2—2 of FIG. 1.
Figure 3:
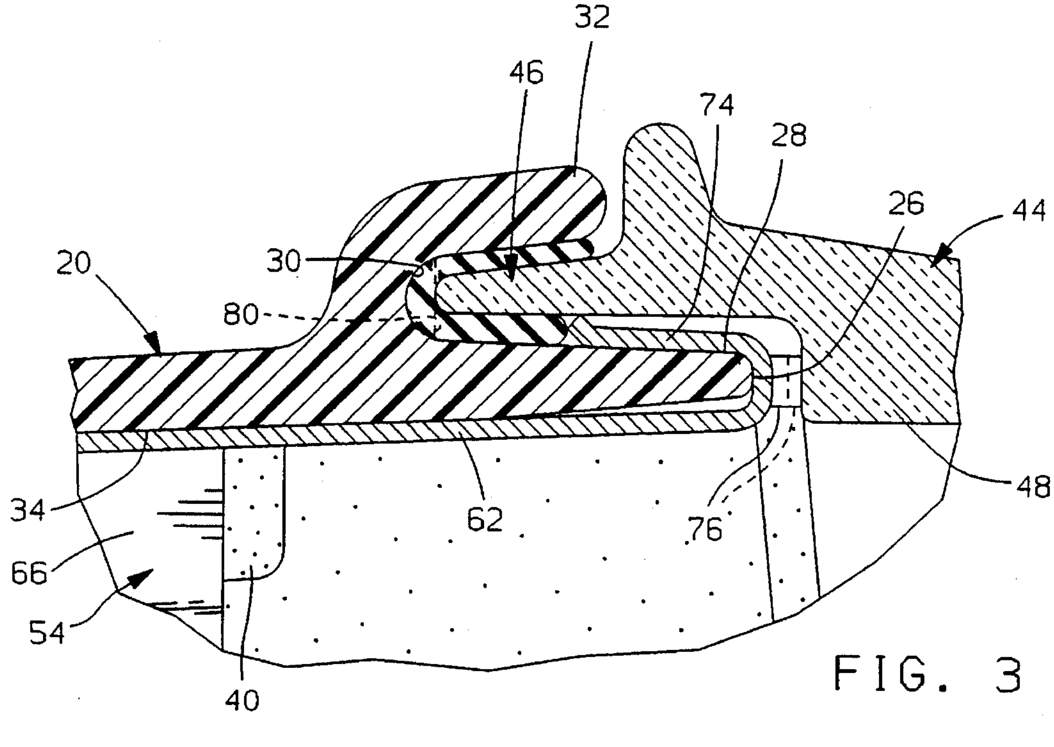
FIG. 3 is an enlargement of a portion of the present invention shown in FIG. 2.
Figure 4:
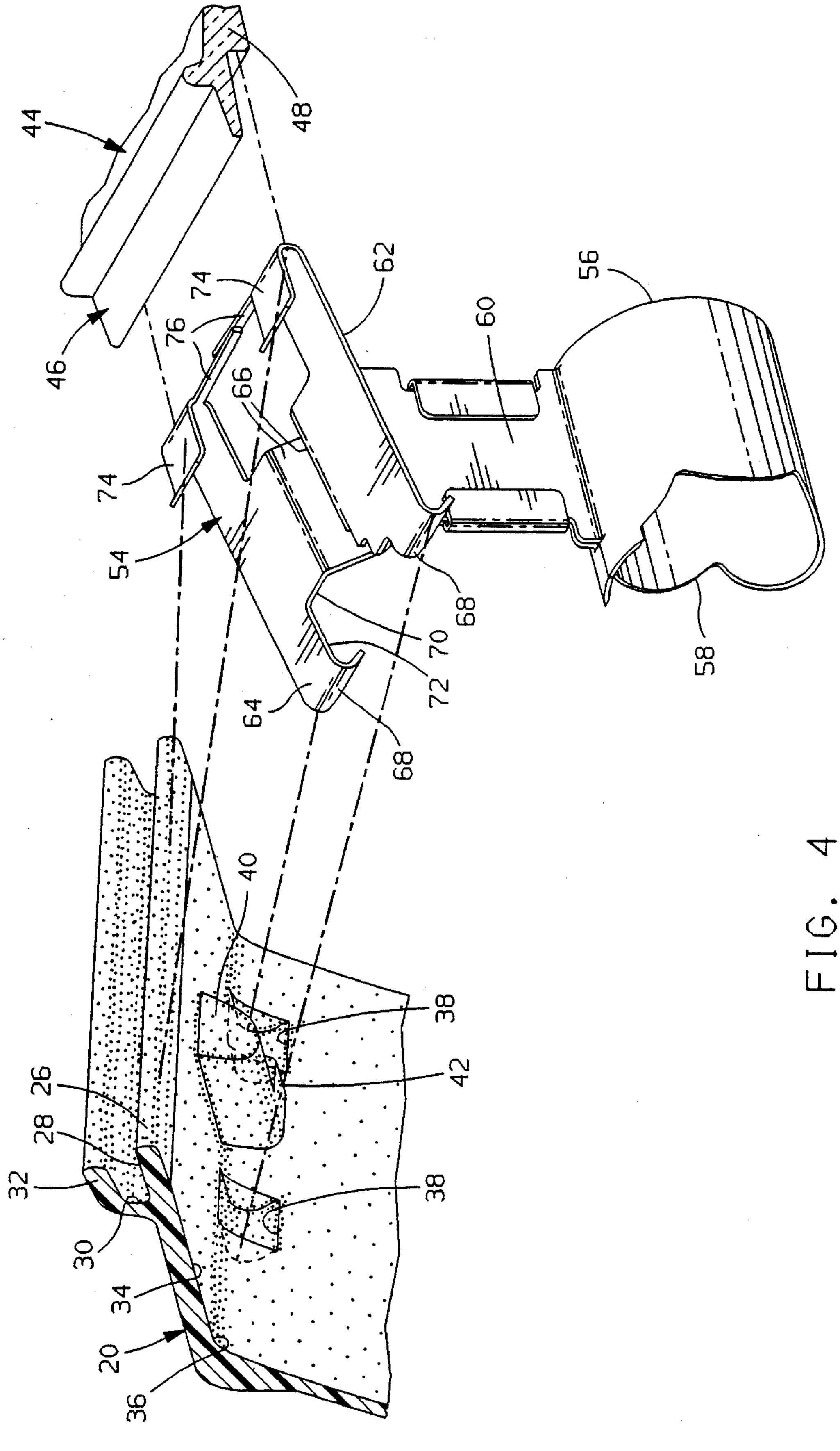
FIG. 4 is an exploded perspective view illustrating a bulb shield according to the present invention before its installation in a reflector housing according to the present invention and entrapment of the bulb shield of the present invention by a lens according to the present invention.

The automotive vehicle headlamp assembly 7 according to the present invention is connected to a bracket 10 which is in turn fixably connected to the chassis or frame of an automotive vehicle. To adjustably connect the headlamp assembly 7 to the bracket 10, there is provided a fixed pivot rod 12 along with two adjuster bodies 14. The fixed pivot rod 12 and adjuster bodies 14 each have at their end a shaft and adjuster ball 16 which are mounted for limited pivotal movement in the ball sockets 18. The ball sockets 18 are fixably connected to a reflector housing 20.

The reflector housing 20 has a first reflector surface (typically parabolic) 22. The parabolic reflector surface 22 is intersected by a central bore 24. Opposite the reflector surface 22 is a reflector housing open end 26 having a top surface 28 and a glue channel 30 which is covered by a sealing outer flange member 32. Connecting the reflector surface 22 to the open end 26 is a second or ledge surface 34. The ledge surface 34 has an intersection 36 with the reflector surface 22. The intersection 36 additionally has two indentations 38. The reflector housing also has an alignment stud 40 and an indexing stud 42.

Joined to the front of the housing 20 is a lens 44. The lens 44 has along its peripheral edge a flange 46. On its upper middle edge, the flange 46 has a vertically downward extending protrusion 48.

Mounted in the reflector housing 20 is a bulb housing 50 which in turn mounts a light bulb 52, which provides a source of electrical illumination for the headlamp assembly 7. To prevent a portion of the illumination from the bulb 52 from emanating in undesirable locations and therefore causing glare, there is a bulb shield 54. Bulb shield 54 has a generally cylindrical first portion 56 which is generally adjacent to the bulb 52 and additionally has a rearward end 58 to prevent light which may cause glare. The cylindrical portion 56 is connected to a leg 60.

The leg 60 branches off to two separate feet 62 and 64. Feet 62 and 64 have a generally identical upper portion 66 which straddles the alignment stud 40 of the reflector housing. Feet 62 and 64 also have rearward rounded end toes 68 which mate into the depressions 38. The fit of the feet 62 and 64 into the depressions 38 support and stabilize the bulb shield 54 vertically.

Due to optical considerations, the lower portion 56 of the bulb shield will not be identical for the left and right headlamp assemblies. Therefore, the foot 64 has an additional cutout portion defined by edges 70 and 72 so that this right side headlamp assembly can only be used on the right (passenger) side headlamp assembly. In like manner, the opposite side headlamp assembly will have the edges 70 and 72 on the foot 62 instead of the foot 64, and the indexing stud 42 will be on the opposite side.

Both of the feet 62, 64 have a front hook 74 which rides on top 28 of the housing inserted within the glue channel 30, thereby supporting the front end of the bulb shield. Furthermore, each hook 74 has a laterally extending spring portion 76.

To assemble the bulb shield 54 to the housing, the bulb shield is brought into alignment with the alignment stud 40 pushed inward until the ends 68 of the feet are within the depressions 38 of the housing. As mentioned previously, the indexing stud 42 in cooperation with the edges 70 and 72 ensure that bulb housing 54 rearward end 58 with the correct orientation is utilized. Glue is then placed within the glue channel, and the lens 44 is brought to close off the front end 26 of the reflector housing 20. The lens flange 46 must contact the back of the glue channel 30 as a means of locating the lens 44. Turning bumps or ribs 80 are strategically located around the periphery of the glue channel 30 to ensure the proper locational fit of the lens 44 with the reflector housing 20. The length of ribs 80 will be modified as required by the molding process and materials used in the reflector housing 20 and lens 44.

The attachment of the bulb shield 54 must not interfere with the assembly of lens 44 to the reflector housing 20. The protrusion 48 moves against the spring section 76 to ensure that the bulb shield 54 is firmly pushed rearwardly while at the same time allowing for compensation in any tolerances in the length of the reflector housing 20 which may occur between the depressions 38 and the open end 26 or which may occur between the rear end 68 of the bulb shield and the front hook 74. There is no snap-on push-in force required as previously required in U.S. Ser. No. 08/239,805, now U.S. Pat. No. 5,386,348. Assembly may be easily done by hand or machine, and proper attachment is assured.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An automotive vehicle headlamp assembly comprising:

a reflector housing having a generally open front end, the reflector housing also having a first reflector surface and a second surface projecting generally forward from the first reflector surface defining an intersection therebetween;

a bulb connected to the housing projecting forward from the reflector surface, providing a source of illumination;

a lens covering the open end of the reflector housing; and a bulb shield having a first portion generally adjacent the bulb, blocking a portion of the illumination given off by the bulb, and the bulb shield having a foot connected by a leg to the first portion, the foot having a front end captured between the lens and the reflector housing and a rear end captured in the intersection between the first reflector surface and the second reflector surface.

2. An automotive vehicle headlamp assembly as described in claim 1 wherein the foot of the bulb shield fits over a top surface of the reflector housing open end.

3. An automotive vehicle headlamp assembly as described in claim 1 wherein the intersection between the first and second surfaces of the reflector housing has an indention for receipt of the rear end of the foot of the bulb shield.

4. An automotive vehicle headlamp assembly as described in claim 1 further including a second foot on the bulb shield and an indexing slot on one of the feet of the bulb shield and reflector body and a corresponding indexing stud on the other of the feet and corresponding stud for mating with the indexing slot, thereby preventing a bulb shield without a proper orientation from being installed with the reflector housing.

5. An automotive vehicle headlamp assembly as described in claim 1 wherein said bulb shield has a second foot generally parallel feet.

6. An automotive vehicle headlamp assembly as described in claim 5 wherein the bulb shield additionally has a spring finger connected to at least one of the feet which urges the bulb shield in a rearward direction by contact with the lens.

7. An automotive vehicle headlamp assembly as described in claim 6 wherein the lens has a protrusion for contact with the bulb shield spring finger.

8. An automotive vehicle headlamp assembly comprising:

a reflector housing having a generally open end with a bore generally opposite the open end, the reflector housing also having a first parabolic reflector surface and a second ledge surface intersecting the parabolic reflector surface and projecting forwardly therefrom to the generally open end, and the reflector housing along the intersection of the parabolic reflector surface and the ledge surface having two generally spaced detentions;

a bulb connected to the housing projecting through the central bore forwardly from the parabolic reflector surface, providing a source of illumination;

a lens covering the open end of the reflector, the lens having a protrusion projecting rearwardly toward the reflector housing; and a bulb shield having a first tubular portion generally encircling the bulb, blocking a portion of the illumination given off by the bulb, and the bulb shield also having a leg connected to the tubular portion and the leg being connected to two generally parallel spaced feet, each foot having a rearward end with a toe captured within the depression in the reflector housing intersection, and each foot having a front hooked end wrapped around the open end of the reflector housing being interlocked over a top surface of the reflector housing open end and having a spring portion for making contact with the protrusion of the lens, wherein the lens captures the front end of the bulb shield feet, thereby retaining the bulb shield in location.

* * * * *